United States Patent [19]

Holder

[11] Patent Number: 4,669,348

[45] Date of Patent: Jun. 2, 1987

[54] MACHINE SAW

[75] Inventor: Kurt Holder, Köngen, Fed. Rep. of Germany

[73] Assignee: Chr. Eisele Maschinenfabrik GmbH & Co. KG, Köngen, Fed. Rep. of Germany

[21] Appl. No.: 850,852

[22] Filed: Apr. 11, 1986

[30] Foreign Application Priority Data

Apr. 19, 1985 [DE] Fed. Rep. of Germany ....... 3514169

[51] Int. Cl.⁴ ..................... B23D 45/14; B23D 47/04; B27B 5/18

[52] U.S. Cl. .................................. 83/466.1; 83/452; 83/477.2; 83/473; 83/488; 83/581

[58] Field of Search ...................... 83/452, 466.1, 488, 83/477.2, 477.1, 453, 581

[56] References Cited

U.S. PATENT DOCUMENTS

| 3,487,863 | 1/1970 | Buckley | 83/581 X |
| 3,768,358 | 10/1973 | Zbinden | 83/488 X |
| 3,946,631 | 3/1976 | Malm | 83/488 X |
| 4,077,161 | 3/1978 | Wyle et al. | 83/477.2 X |
| 4,294,150 | 10/1981 | Vierstraete | 83/453 |

FOREIGN PATENT DOCUMENTS 1091467 10/1954 France ............................. 83/477.1

Primary Examiner—Donald R. Schran
Attorney, Agent, or Firm—Pahl, Lorusso & Loud

[57] ABSTRACT

A machine saw comprises a machine frame, a slotted flat plate rotatable about a vertical axis and serving to receive a workpiece to be sawn, a motor-driven circular saw blade which is rotatable about a horizontal axis of rotation and is adapted to be passed upwards through the slot in the rotatable plate from beneath during sawing, a clamping bridge which is fixed in relation to the frame and spans the rotatable plate and a clamping device mounted by the bridge for clamping a workpiece on the rotatable plate. Part of the clamping device is formed by a clamping jaw movable vertically upwards and downwards and adapted to be set down onto the workpiece, this clamping jaw being rotatable about the axis of rotation of the rotatable plate and displaceable at right angles to this axis of rotation in a sliding guide means.

6 Claims, 5 Drawing Figures

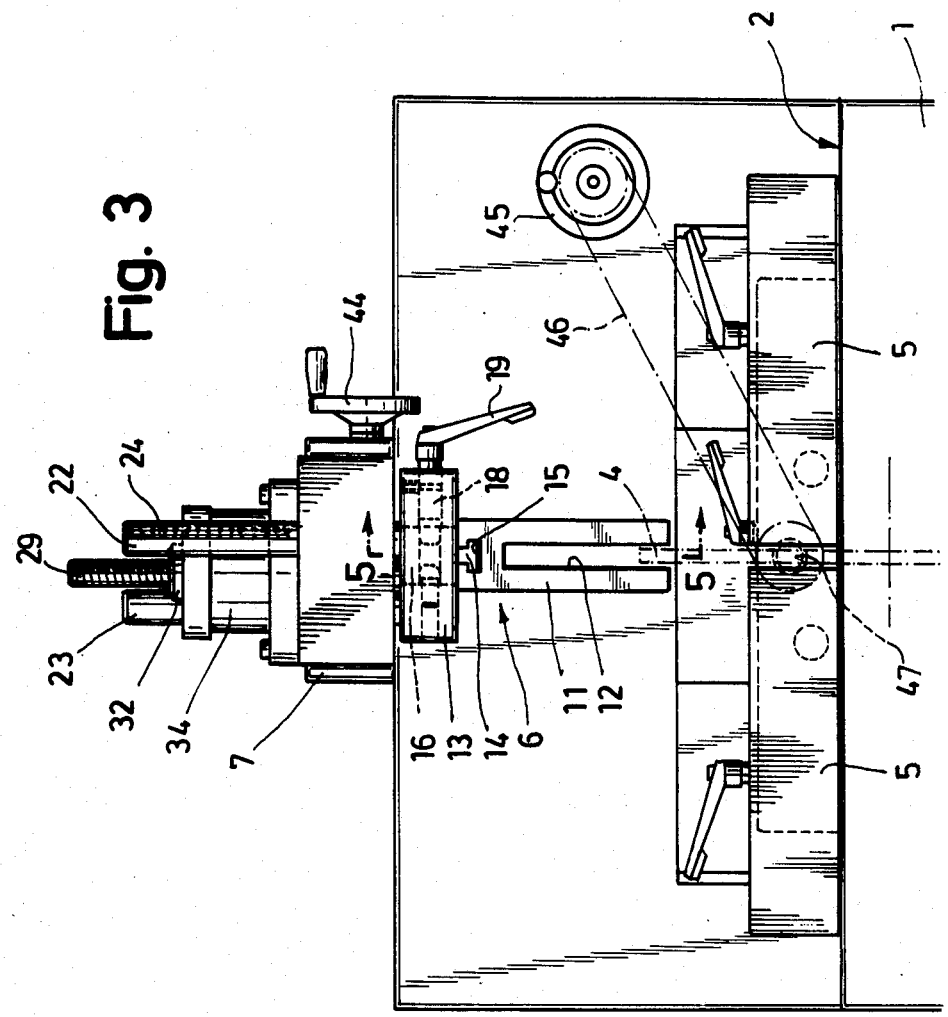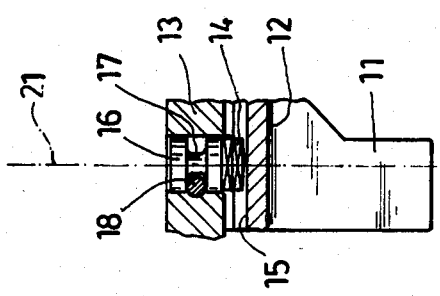

MACHINE SAW

The invention relates to a machine saw comprising a machine frame, a slotted flat plate which is rotatable about a vertical axis and serves to receive a workpiece to be sawn, a motor-driven circular saw blade which has a horizontal axis of rotation and is adapted to be passed upwards through the slot in the rotatable plate from beneath during sawing, a clamping bridge fixed in relation to the frame and spanning the rotatable plate and a clamping device mounted by the bridge for clamping a workpiece on the rotatable plate.

In known machine saws of this type a solid block of metal or wood is used to clamp the workpiece. This block is inserted between the workpiece and the clamping device which is adjustable only in a vertical direction. The workpiece is clamped against the rotatable plate by the block when the clamping device is adjusted in the vertical direction. Since the stroke of the saw blade is not normally limited in the upward direction, the saw blade cuts into the block once it has sawn through the workpiece. The block must therefore be replaced by a new one once it has been cut a number of times by the saw blade. Otherwise, the desired high degree of clamping accuracy can mostly not be achieved.

The object of the invention is therefore to design a machine saw of the type in question such that the clamping device may be adjusted quickly, accurately and simply by hand to various sizes of workpiece and angles of cut without any risk of the clamping device becoming damaged during sawing.

The object of the invention is accomplished in that the clamping device comprises a clamping jaw movable vertically upwards and downwards and adapted to be set down onto the workpiece, that the clamping jaw is rotatable about the axis of rotation of the rotatable plate and that the clamping jaw is displaceable in a sliding guide means at right angles to its axis of rotation.

The following description of a preferred embodiment of the invention serves to explain the invention further in conjunction with the attached drawings, in which FIG. 1 is a diagrammatic view of a circular saw machine comprising a saw blade introduced into a workpiece from below;

FIG. 3 is a view of the machine seen in the direction of arrow A in FIG. 2;

FIG. 5 is an enlarged part-sectional view along line 5—5 in FIG. 3.

Figure 1:
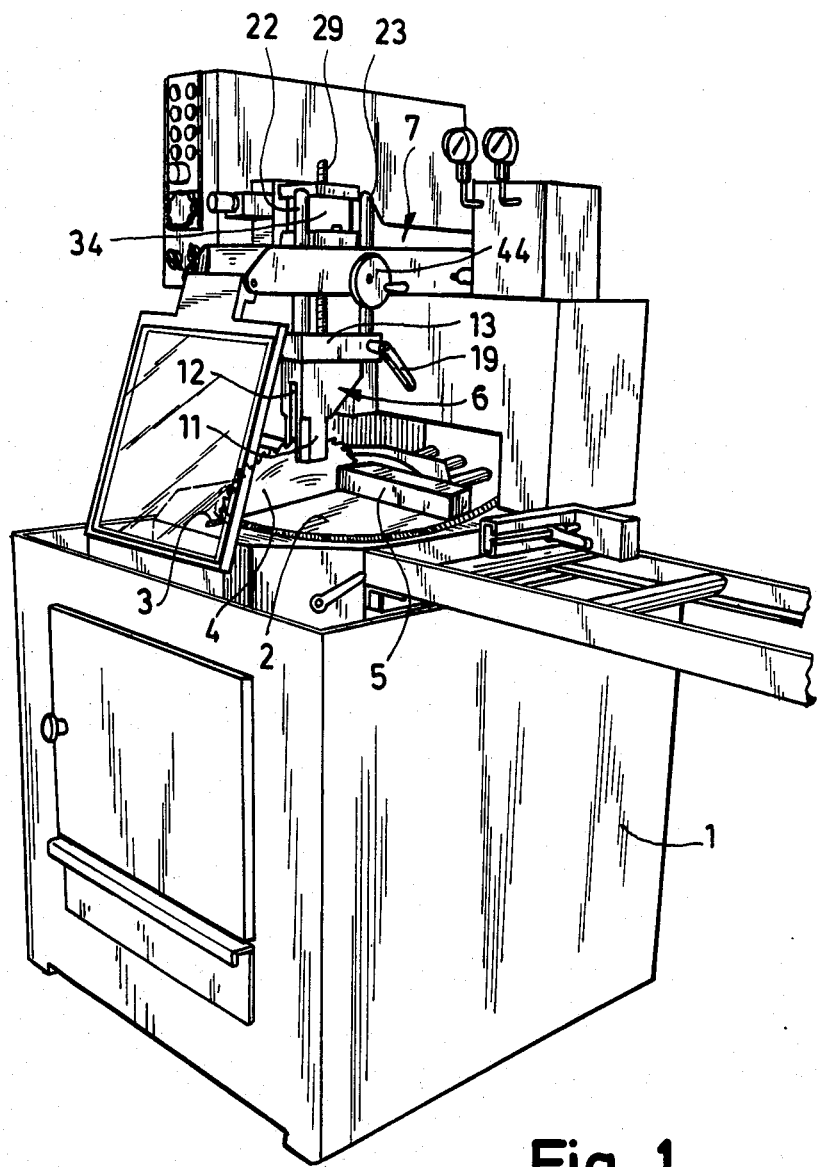

The machine saw diagrammatically illustrated in FIG. 1 comprises a block-shaped machine frame 1, in which a flat plate 2 serving in the known manner as a worktable is mounted for rotation about a vertical axis. The rotatable plate 2 has a diametral slot 3 through which a circular saw blade 4 is passed upwardly from beneath. The saw blade 4 which rotates about a horizontal axis of rotation is driven by an electric motor which is not illustrated. A lifting and lowering device for the circular saw blade 4 is connected to the plate 2 to form a single unit rotatable about the said vertical axis. This lifting and lowering device is also known per se and therefore not specifically illustrated in detail.

A workpiece W (FIG. 2) to be sawn is placed on the rotatable plate 2 in a manner known per se and caused to engage on a stop 5 located above the plate 2. The workpiece is firmly clamped on the plate 2 in this position by a vertically adjustable clamping device 6. This clamping device 6 is mounted for vertical displacement on a clamping bridge 7 spanning the rotatable plate 2.

The workpiece held in this way can now be cut from bottom to top by displacement of the saw blade 4. The cuts can be made vertically or at an angle to the workpiece axis which differs from 90°.

Figure 2:
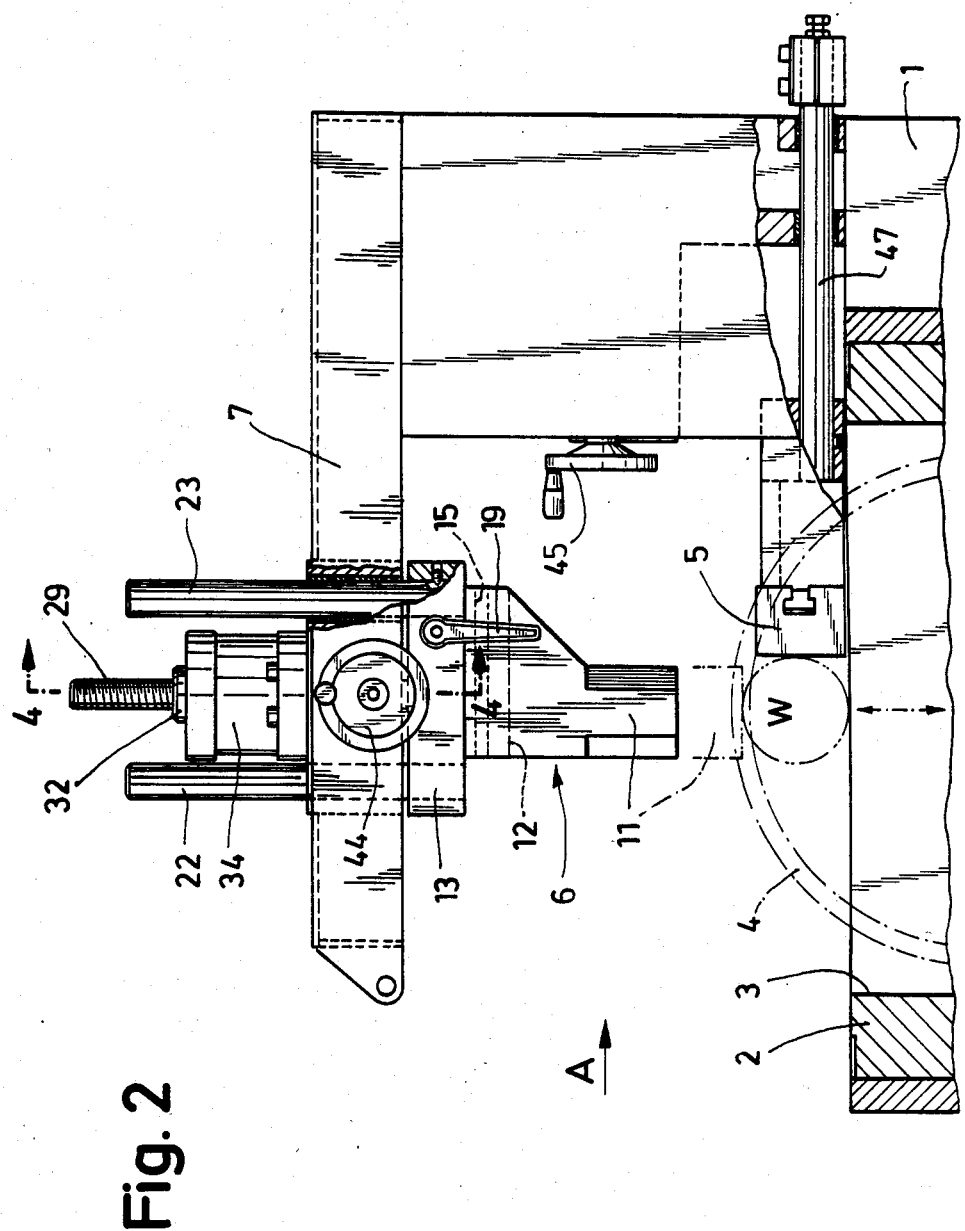
FIG. 2 is a partially cut-away side view of the circular saw machine.

As shown in particular in FIGS. 2 and 3, the clamping device 6 comprises, as essential component, a clamping jaw 11 which may be diplaced vertically upwards and downwards and set down onto the workpiece W. This clamping jaw is forked and has a vertical slot for the circular saw blade 4 to enter. The length or height of the slot is at least equal to the maximum length of stroke of the circular saw blade. This means that even if no workpiece is being sawn or the workpiece is only very thin, the free ends of the clamping jaw 11 will rest more or less directly on the rotatable plate 2 and so the clamping device 6 cannot be damaged by the saw blade 4.

A guide plate 13 which is also part of the clamping device 6 is arranged above the clamping jaw 11. A T-shaped guide pin 14 projects downwardly from this guide plate and engages in a complementary T-shaped groove 15 (FIG. 5) in the clamping jaw 11. The pin 14 and the groove 15 thus form a sliding guide means for displacement of the clamping jaw 11 back and forth along a straight path on the underside of the guide plate 13. This path extends in the plane of drawing of FIGS. 2 and 5 and at right angles to the plane of drawing in FIG. 3.

A circular-cylindrical pivot pin 16 is integrally connected to the guide pin 14 (cf. FIG. 5) and has the shape of a double-T profile due to an annular groove 17. An eccentric shaft 18 mounted in the guide plate 13 engages in this annular groove 17 and is rotatable by means of a handle 19. When the eccentric shaft 18 is adjusted accordingly by means of the handle 19, the clamping jaw 11 may be firmly clamped to the underside of the guide plate 13.

The pivot pin 16 is mounted in the guide plate, which is held on the bridge 7 so as to be non-displaceable in a horizontal direction, such that its axis of rotation 21 always coincides exactly with the vertical axis of rotation of the plate 2. This ensures that the clamping jaw 11 can always be adjusted in response to the angular position of the plate 2 such that the saw blade 4 engages exactly in the slot 12 of the clamping jaw 11 without touching it, even if the clamping jaw 11 has been moved away from a predetermined zero position in the sliding guide means formed by the guide pin 14 and the groove 15. This means that the clamping jaw 11 can to a large extent be set down centrally onto the workpiece in any position of the workpiece abutting on the stop 5. It is therefore possible for the workpiece to be clamped very exactly. At the same time, the slot 12 in the clamping jaw 11 can always be aligned such that the saw blade 4 penetrates the slot without coming into contact with it. The clamping jaw 11 is displaced in the guide plate 13 by means of the sliding guide means in a direction at right angles to the axis of rotation of the clamping jaw 11 and the rotatable plate 2.

The guide plate 13 and, with it, the clamping jaw 11 are mounted in the clamping bridge 7 for vertical upward and downward movement by means of guide rods 22, 23 projecting rigidly from the guide plate 13. The guide rod 22 bears a scale 24 from which the respective height adjustment may be read.

Figure 4:
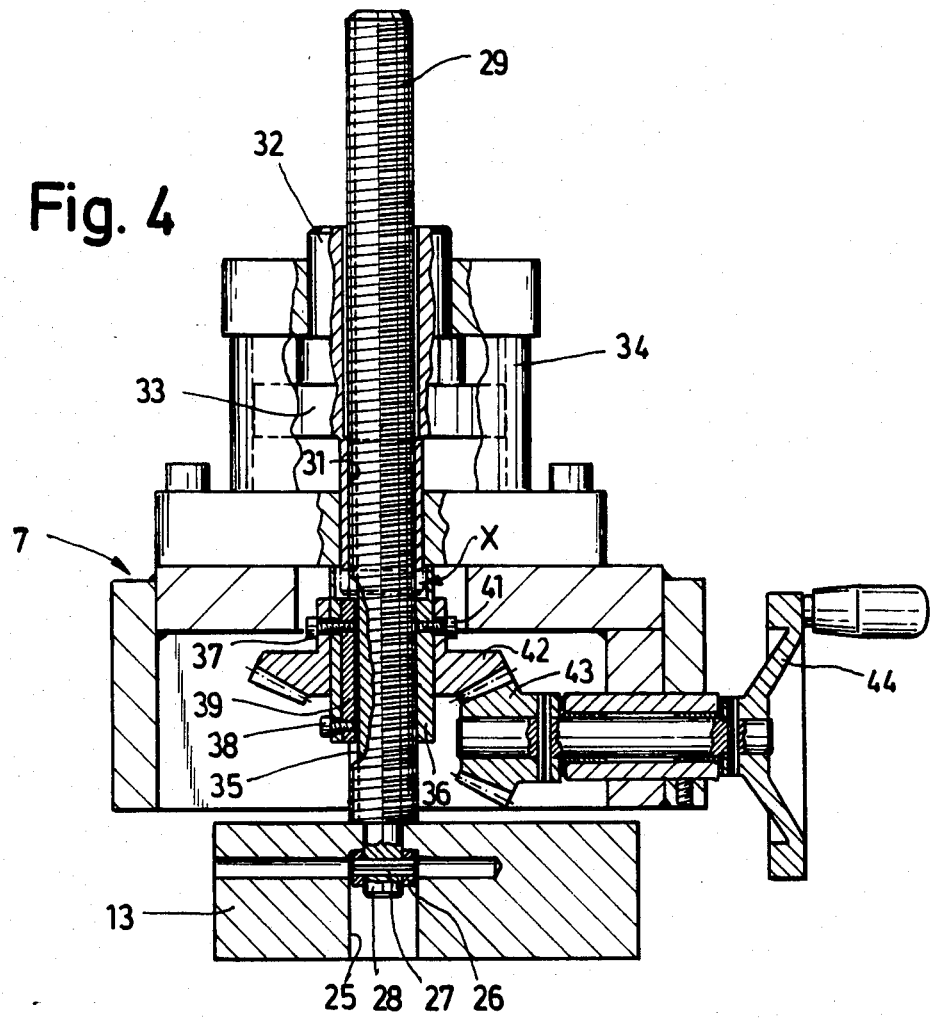
FIG. 4 is an enlarged sectional view along line 4—4 in FIG. 2.

As shown in particular in FIG. 4, the guide plate 13 is rotatably mounted on the lower end 28 of a screw spindle 29 by means of a recess 25 worked into the guide plate, a ring 26 which fits into the recess 25 to rest on its base and a straight split pin 27. When the screw spindle 29 is rotated upwards or downwards, the guide plate, which is non-rotatably guided by the guide rods 22, 23, will also move upwards or downwards. The screw pindle 29 has an external thread which engages in the internal thread of a section 31 of a hollow piston rod 32 which is rigidly connected to a piston 33. The piston and, with it, the piston rod are displaced in a manner known per se in a cylinder 34 for pressure medium and this causes the screw spindle and, with it, the guide plate 13 to be moved as well. The stroke of the piston 33 in the cylinder 34 is only very limited, e.g. about 8 mm, when a corresponding pressure medium is supplied to it (compressed air or hydraulic oil). The maximum stroke is indicated in FIG. 4 as a dash-dot line and by arrow X.

The screw spindle 29 has an axis-parallel longitudinal groove 35 in its outer surface (to the left in FIG. 4). In the region below the threaded section 31 provided on the piston rod 32, the screw spindle is loosely encircled by a cylindrical bushing 36. A spring 39 which is held by screws 37, 38 projects inwardly from the inner wall of this bushing and into the longitudinal groove 35. This forms a connection between the bushing 36 and the screw spindle 29 such that one element cannot rotate relative to the other although the screw spindle 29 may move axially in relation to the bushing 36. A bevel gear 32 is non-rotatably connected to the bushing 36 by the screw 37 and additional screws 41 and this bevel gear meshes with a further bevel gear 43. The bevel gear 43 may be caused to rotate by means of a handwheel 44 rotatably mounted on the clamping bridge 7 and this causes the bushing 36 to be displaced as well via the bevel gear 42. Thus, the spindle 29 is caused to rotate via the spring 39 and is, at the same time, displaced relative to the piston rod 32 due to the longitudinal groove 35. As the cylinder 34 for pressure medium, which includes the piston rod 32, is stationarily mounted on the bridge 7, the guide plate 13 rotatably connected to the screw spindle 8 may travel a greater distance upwards and downwards. This displacement of the guide plate 13 serves for coarse adjustment of the clamping jaw 11 relative to a workpiece to be sawn. Coarse adjustment is preferably made such that the clamping jaw 11 sits loosely on the workpiece with its free forked end. Subsequently, for the actual clamping of the workpiece W on the rotatable plate 2, the cylinder 34 for pressure medium is actuated and its piston rod 32 pressed with considerable force downwards through the aforementioned, short part of travel X. Since the clamping jaw 11 is also rigidly connected to the piston rod 32 via the screw spindle 29 and the guide plate 13, the clamping jaw is also pressed with considerable force onto the workpiece W and holds the workpiece firmly in the desired position on the rotatable plate 2.

FIGS. 2 and 3 illustrate an additional handwheel 45 which serves, by means of a chain 46, to adjust a further screw spindle mounted horizontally in the machine frame. This screw spindle 47 serves to suitably position the stop 5 over the rotatable plate 2, this stop also including a slot for passage of the saw blade 4.

I claim:

1. A machine saw comprising
   a machine frame,
   a slotted flat plate rotatable about a vertical axis and serving to receive a workpiece to be sawn,
   a motor-driven circular saw blade having a horizontal axis of rotation and being adapted to be passed upwards through the slot in the rotatable plate from beneath during sawing.
   a stationary clamping bridge fixed in relation to the frame and spanning the rotatable plate, and
   a clamping device mounted to said bridge for clamping a workpiece on the rotatable plate, said clamping device comprising a clamping jaw movable vertically upwards and downwards and adapted to be set down onto the workpiece, said clamping jaw having the same axis of rotation as the rotatable plate, and said clamping jaw is displaceable in a sliding guide means at right angles to its axis of rotation.

2. Machine saw as defined in claim 1, wherein the clamping jaw is rotatably mounted on the underside of a vertically adjustable guide plate by a pivot pin and said pivot pin is simultaneously a guide pin for the sliding guide means formed in the clamping jaw and engages for this purpose in a guide groove in the clamping jaw.

3. Machine saw as defined in claim 2, wherein the clamping jaw is adapted to be fixed in position by an eccentric locking means on the guide plate.

4. Machine saw as defined in claim 1, wherein said clamping jaw is forked and said forked clamping jaw has a vertical slot for receiving the circular saw blade, and the height of said slot is at least equal to the maximum length of strokes of the saw blade.

5. Machine saw as defined in claim 1, wherein the clamping jaw is adapted to be pre-set relative to the workpiece by a screw spindle drive and to be pressed onto the workpiece by a cylinder for pressure medium.

6. Machine saw as defined in claim 5, wherein the screw spindle drive and the cylinder for pressure medium engage the guide plate mounting the clamping jaw.

* * * * *